United States Patent [19]
Iwashita et al.

[11] Patent Number: 5,367,611
[45] Date of Patent: Nov. 22, 1994

[54] FUZZY INFERENCE SYSTEM

[75] Inventors: Kouichi Iwashita; Masanari Oh, both of Fukuoka, Japan

[73] Assignee: Rohm Co., Ltd., Kyoto, Japan

[21] Appl. No.: 992,536

[22] Filed: Dec. 17, 1992

[30] Foreign Application Priority Data

Dec. 27, 1991 [JP] Japan ................... 3-347544
Nov. 20, 1992 [JP] Japan ................... 4-311528

[51] Int. Cl.$^5$ ............................................. G06F 7/70
[52] U.S. Cl. ........................................ 395/3; 395/10; 395/11; 395/900
[58] Field of Search ................... 395/10, 11, 900, 3

[56] References Cited

U.S. PATENT DOCUMENTS

| | | | |
|---|---|---|---|
| 5,149,472 | 9/1992 | Suganuma | 395/900 |
| 5,167,005 | 11/1992 | Yamakawa | 395/3 |
| 5,191,638 | 3/1993 | Wakami et al. | 395/11 |
| 5,251,285 | 10/1993 | Inoue et al. | 395/10 |

OTHER PUBLICATIONS

Mandal et al, "Formulation of a multivalued recognition system"; IEEE Transactions on Systems, Man and Cybernetics, vol. 22 iss. 4, pp. 607–620. Jul.–Aug. 1992.
Mizumoto, "Realization of PID controls by fuzzy control methods"; IEEE International Conference on Fuzzy Systems, pp. 709–715, 8–12 Mar. 1992.

*Primary Examiner*—Allen R. MacDonald
*Assistant Examiner*—Tariq Hafiz
*Attorney, Agent, or Firm*—Oliff & Berridge

[57] ABSTRACT

A fuzzy inference system includes a combination of fuzzy inference units. Each of the fuzzy inference units includes a plurality of fuzzy inference circuit sections and difuzzifier and is adapted to treat an input variable to form a controlled variable in accordance with a given fuzzy control rule. In order to extend the number of input variables and/or rules, the fuzzy inference circuit section of each of the fuzzy inference units includes an external extension input terminal, an external extension output terminal, a rule extending terminal and a change-over switch. When the external extension input terminal of one fuzzy inference unit is connected to that of the other fuzzy inference unit, the number of input variables can be extended. When the rule extending terminal of one fuzzy inference unit is connected to that of the other fuzzy inference unit, the number of rules can be easily extended.

5 Claims, 6 Drawing Sheets

|  | ΔE | | | | |
|---|---|---|---|---|---|
|  | NB | NS | ZO | PS | PB |
| E NB |  |  | NB |  |  |
| NS |  |  | NS |  |  |
| ZO | NB | NS | ZO | PS | PB |
| PS |  |  | PS |  |  |
| PB |  |  | PB |  |  |

Fig. 4

|  | ΔE | | | | |
|---|---|---|---|---|---|
|  | NB | NS | ZO | PS | PB |
| E NB | NB | NB | NB |  |  |
| NS | NB | NS | NS |  |  |
| ZO | NB | NS | ZO | PS | PB |
| PS |  |  | PS | PS | PB |
| PB |  |  | PB | PB | PB |

Fig. 5

FUZZY INFERENCE SYSTEM

BACKGROUND OF THE INVENTION

1. Field of the Invention

The present invention relates to a hardware system for realizing the fuzzy reasoning which is applied to control, pattern recognition, decision making, diagnosis and so on.

2. Description of the Related Art

FIG. 1 shows a conventional fuzzy inference system which comprises membership function generating circuits 10a–10d each for generating a membership function to calculate an adaptation to the input, minimum value calculating circuits each for calculating an adaptation for each of fuzzy inference rules, a maximum value calculating circuit 14 for integrating inferences calculated from the fuzzy inference rules, and difuzzifier 16 for performing a centrobaric defuzzy based on a fuzzy inference rule having the second half thereof (conclusion part) which consists of equidistant singletones to calculate a controlled variable.

When it is desired to form a general purpose inference unit as hardware in such a conventional fuzzy inference system and if an object aimed by the fuzzy inference becomes complicated, the number of input variables and rules is limited.

SUMMARY OF THE INVENTION

An object of the present invention is to provide a general purpose fuzzy inference system which comprises external extended terminals and a plurality of fuzzy inference units connected to each other, thereby facilitating the extension of the following respects:

(1) the number of input variables;
(2) the number of rules; and
(3) the number of input variables and rules.

To this end, the present invention provides a fuzzy inference system comprising a combination of fuzzy inference units, each of said fuzzy inference units including a plurality of fuzzy inference means for performing a fuzzy reasoning in accordance with a given rule and difuzzifier means for calculating the outputs of said fuzzy inference means to form a controlled variable to be outputted, each of said fuzzy inference means comprising a plurality of membership function generating means, an external extension input means for extending a variable, a first minimum value calculating means for calculating the minimum value from the outputs of said membership function generating means, a second minimum value calculating means connected to said external extension input means and first minimum value calculating means, said second minimum calculating means being adapted to calculate the minimum value from the input signal from said external extension input means and the outputs of said first minimum value calculating means, a maximum value calculating means for outputting the maximum value from the outputs of said second minimum value calculating means, and an external extension output means for externally outputting the output of said maximum value calculating means.

The present invention also provides a fuzzy inference system comprising a combination of fuzzy inference units, each of said fuzzy inference units including a plurality of fuzzy inference means and difuzzifier means for calculating the outputs of said fuzzy inference means to form a controlled variable to be outputted, each of said fuzzy inference means comprising a plurality of membership function generating means, a external rule extending means for extending a rule, a minimum value calculating means for calculating the minimum value from the outputs of said membership function generating means, a maximum value calculating means connected to said external rule extending means and minimum value calculating means, said maximum value calculating means being adapted to calculate the maximum value from the input from said external rule extending means and the outputs of said minimum value calculating means, and an external extension output means for externally outputting the output of said maximum value calculating means.

The present invention further provides a fuzzy inference system comprising a combination of fuzzy inference units, each of said fuzzy inference units including a plurality of fuzzy inference means for performing a fuzzy reasoning in accordance with a given rule and difuzzifier means for calculating the outputs of said fuzzy inference means to form a controlled variable to be outputted, each of said fuzzy inference means comprising a plurality of membership function generating means, an external extension input means for extending a variable, an external rule extending means for extending a rule, a first minimum value calculating means for calculating the minimum value from the outputs of said membership function generating means, a second minimum value calculating means connected to said external extension input means and first minimum value calculating means, said second minimum calculating means being adapted to calculate the minimum value from the input signal from said external extension input means and the outputs of said first minimum value calculating means, a maximum value calculating means connected to said external rule extending means and second minimum value calculating means and adapted to calculate the maximum value from the input signal from said external rule extending means and the outputs of said second minimum value calculating means, and an external extension output means for externally outputting the output of said maximum value calculating means.

BRIEF DESCRIPTION OF THE DRAWINGS

FIG. 4 is a table illustrating a fuzzy rule prior to extension.

FIG. 5 is a table illustrating the fuzzy rule after extension.

DESCRIPTION OF THE PREFERRED EMBODIMENTS

Figure 1:
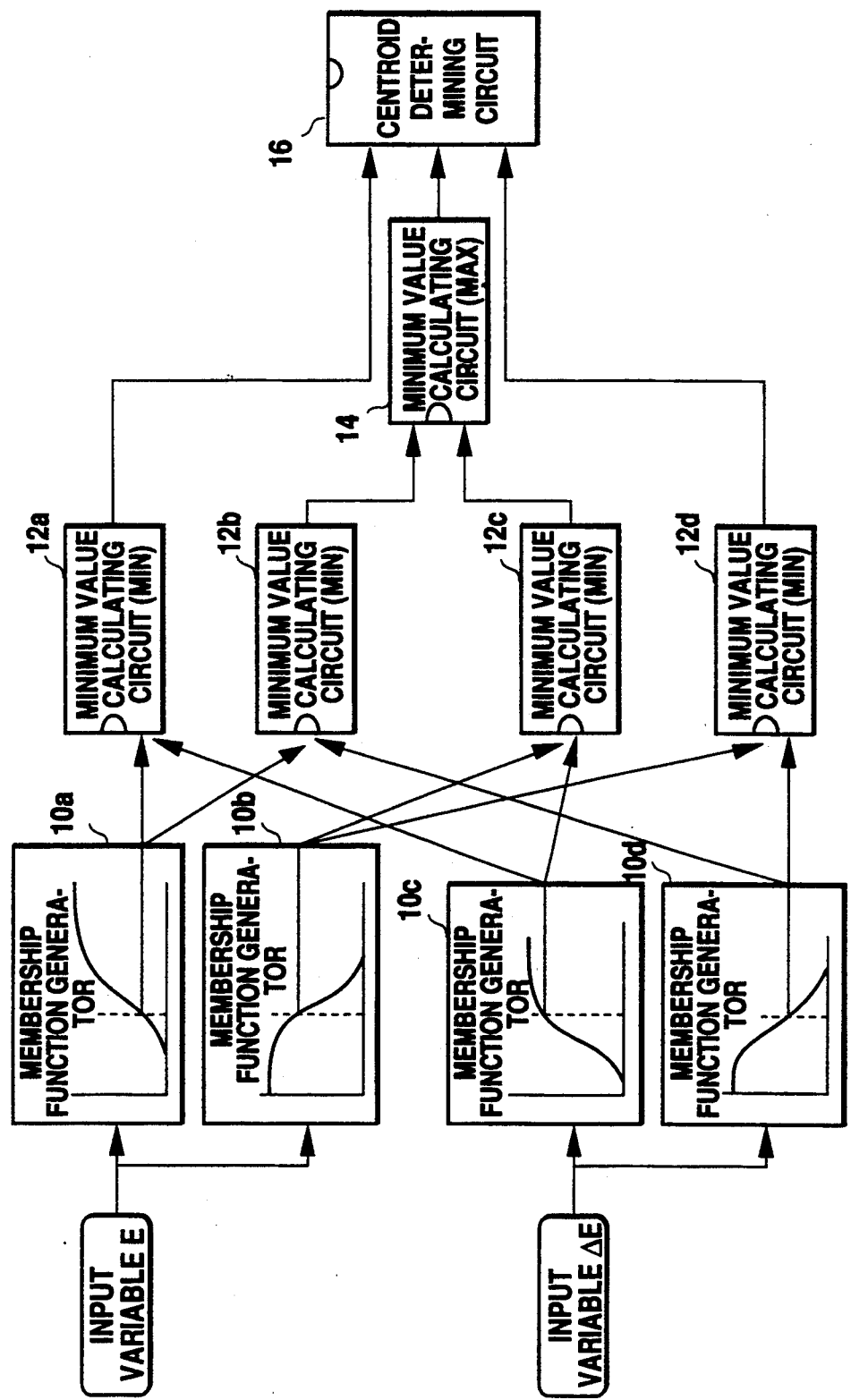
FIG. 1 is a schematic block diagram of a fuzzy inference system constructed in accordance with the related art.

The present invention will now be described in connection with some preferred embodiments thereof illustrated in the drawings.

Figure 2:
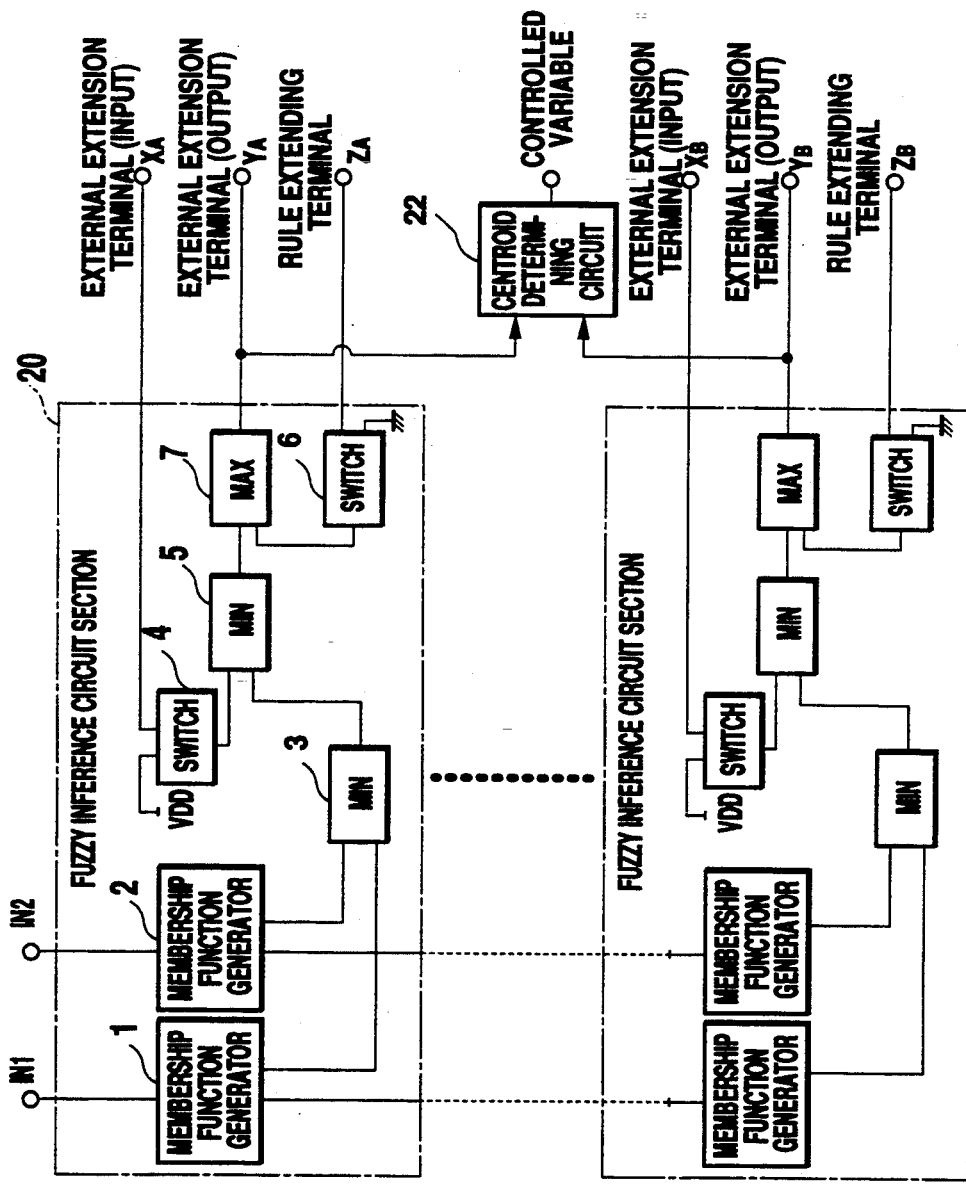
FIG. 2 is a block diagram of fuzzy inference units in one embodiment of a fuzzy inference system constructed in accordance with the present invention.

Referring to FIG. 2, there is shown a fuzzy inference unit constructed in accordance with the present invention. A plurality of such fuzzy inference units are combined to form a fuzzy inference system as will be described later. The fuzzy inference units comprises a plurality of fuzzy inference circuit sections 20 and difuzzifier 22. Each of the fuzzy inference circuit sections 20 includes membership function generating circuits 1 and 2, each of which has the previously set configuration of its membership function, a first minimum value calculating circuit (MIN) 3, a second minimum value calculating circuit (MIN) 5, a maximum value calculating circuit (MAX) 7 and change-over switches 4 and 6. The change-over switch 4 has two input terminals and an output terminal. One of the two input terminals is connected to an external extended terminal (input) while the other input terminal is connected to a power source VDD. The output terminal of the change-over switch 4 is connected to the first minimum value calculating circuit 5. The change-over switch 6 has three terminals, one of these terminals is connected to the maximum value calculating circuit 7 and another one is connected to a rule extending terminal. The remaining terminal of the three terminals is grounded. The output of the maximum value calculating circuit 7 is outputted through an external extended terminal (output) and at the same time supplied to the centroid determining circuit 22. Thus, the final controlled variable is outputted through the centroid determining circuit 22. In such a manner, one fuzzy inference circuit section 20 will perform a calculation in accordance with one fuzzy control rule.

The membership function generating circuits 1 and 2 are respectively connected to input terminals IN1 and IN2 for supplying input signals to the membership function generating circuits 1 and 2. Each of the membership function generating circuits 1 and 2 is adapted to calculate an adaptation to the membership function of the input value, the adaptation being then applied to the first minimum value calculating circuit 3. If the input variable is not to be extended, the change-over switch 4 is placed at the side "1" so that the power source VDD is coupled with the second minimum value calculating circuit 5. At the same time, the change-over switch 6 is placed at the grounding side "2". As a result, the output of the first minimum value calculating circuit 3 is applied to the centroid determining circuit 22 through the second minimum value calculating circuit 5 and maximum value calculating circuit 7. Thus, the centroid determining circuit 22 will output a controlled variable.

The extension of the fuzzy inference has three classifications:

(1) Extension in only the number of input variables;
(2) Extension in only the number of rules; and
(3) Extension in both the number of input variables and rules.

The fuzzy inference units shown in FIG. 2 can deal with all three extensions. By suitably selecting the change-over switches 4, 6 and their positions, each of the fuzzy inference units can realize any one of these extensions.

More particularly, when only the input variable is to be extended, the external extension input terminal of the fuzzy inference unit receives an extension signal from the external extension input terminal of the other fuzzy inference unit. The change-over switch 4 is set at the side "2" (external extension input terminal side) while the change-over switch 6 is set at the side "2" (grounding side). Thus, the second minimum value calculating circuit 5 will receive the output of the first minimum value calculating circuit 3 as well as the extension signal from the external extension input terminal. The smallest one of these signals is supplied from the second minimum value calculating circuit 5 through the maximum value calculating circuit 7 to the centroid determining circuit 22.

When only the number of rules is to be extended, the rule extending terminal of the fuzzy inference unit receives an extension signal from the rule extending terminal of the other fuzzy inference unit. The change-over switch 4 is placed at the side "1" (power source VDD side) while the change-over switch 6 is placed at the side "1" (rule extending terminal side). Thus, the maximum value calculating circuit 7 will receive the output of the second minimum value calculating circuit 5 or the output of the first minimum value calculating circuit 3 as well as the extension signal from the rule extending terminal. The largest one of these signals will be supplied to the centroid determining circuit 22.

When both the number of input variables and rules are to be extended, the aforementioned procedures may be combined. In other words, the extension requires only that the change-over switch 4 is set at the side "2" while the change-over switch 6 is placed at the side "1".

Referring to FIGS. 3–7, the three extension modes (1), (2) and (3) will be described in detail.

Figure 3:
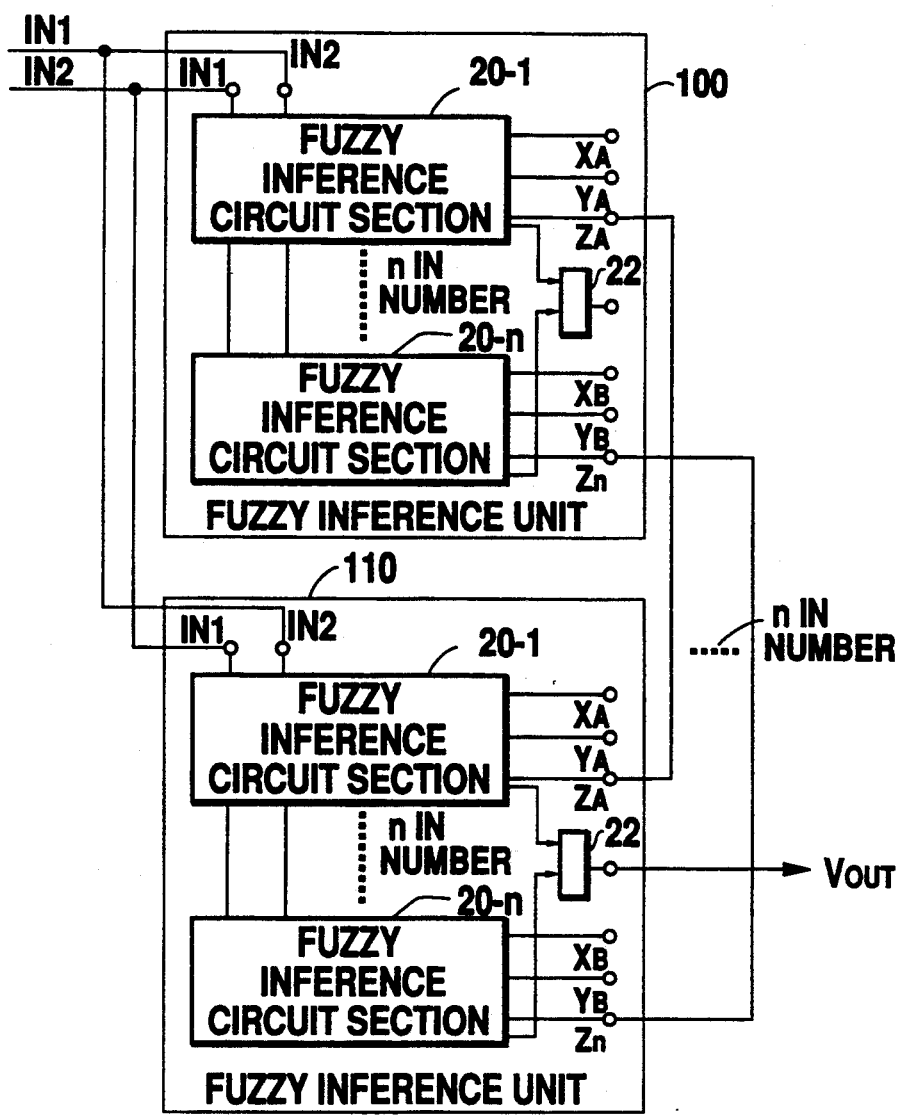
FIG. 3 is a block diagram of another embodiment of a fuzzy inference system constructed to extend the number of rules in accordance with the present invention.

FIG. 3 shows the arrangement of a fuzzy inference system which is adapted to extend the number of rules but not the number of input variables. The fuzzy inference system comprises two fuzzy inference units 100 and 110, each of which comprises fuzzy inference circuit sections 20-1, 20-2, . . . 20-n of n in number and difuzzifier 22. Each fuzzy inference unit 100 or 110 comprises external extension input terminals $X_A$, $X_B$, external extension output terminals $Y_A$, $Y_B$ and rule extending terminals $Z_A$, $Z_B$. In order to extend the number of rules, the rule extending terminal of the fuzzy inference circuit section in the fuzzy inference unit 100 is connected to that of the corresponding fuzzy inference circuit section In the fuzzy inference unit 110. For example, the rule extending terminal $Z_A$ of the fuzzy inference circuit section 20-1 in the fuzzy inference unit 100 may be connected to the rule extending terminal $X_A$ of the fuzzy inference unit 20-1 in the fuzzy inference unit 110.

Fuzzy control rules treated in the fuzzy inference unit 100 before the number of rules is extended, that is, prior to the interconnection between the fuzzy inference units 100 and 110, is shown in FIG. 4. FIG. 4 is a table illustrating a combination of nine rules. For an input variable E, five evaluation standards (labels), that is, NB(Negative Big), NS(Negative Small), ZO(Zero), PS(Positive Small) and PB(Positive Big) are set. Five evaluation standards (labels), that is, NB(Negative Big), NS(Negative Small), ZO(Zero), PS(Positive Small) and PB(Positive Big) are also set for an input variable ΔE. The fuzzy control rules are as follows:

"If the input variable E is NB and also the input variable ΔE is ZO, the controlled variable is NB."

"If the input variable E is NS and also the input variable ΔE is ZO, the controlled variable is NS."

"If the input variable E is ZO and also the input variable ΔE is NB, the controlled variable is NB."

"If the input variable E is ZO and also the input variable ΔE is NS, the controlled variable is NS."

"If the input variable E is ZO and also the input variable ΔE is ZO, the controlled variable is ZO."

"If the input variable E is ZO and also the input variable ΔE is PS, the controlled variable is PS."

"If the input variable E is ZO and also the input variable ΔE is PB, the controlled variable is PB."

"If the input variable E is PS and also the input variable ΔE is ZO, the controlled variable is PS."

"If the input variable E is PB and also the input variable ΔE is ZO, the controlled variable is PB." Although there are nine rules that can be treated by the fuzzy inference unit 100, 17 total rules can be treated by connecting the fuzzy inference unit 100 to the other fuzzy inference unit 110 to provide eight additional rules, as shown in FIG. 5. In such a case, the rules treated by the fuzzy inference unit 110 are as follows:

"If the input variable E is NB and also the input variable ΔE is NB, the controlled variable is NB."

"If the input variable E is NB and also the input variable ΔE is NS, the controlled variable is NB."

"If the input variable E is NS and also the input variable ΔE is NB, the controlled variable is NB."

"If the input variable E is NS and also the input variable ΔE is NS, the controlled variable is NS."

"If the input variable E is PS and also the input variable ΔE is PS, the controlled variable is PS."

"If the input variable E is PS and also the input variable ΔE is PB, the controlled variable is PB."

"If the input variable E is PB and also the input variable ΔE is PS, the controlled variable is PB."

"If the input variable E is PB and also the input variable ΔE is PB, the controlled variable is PB."

In such a manner, each of the fuzzy inference units 100 and 110 can generate a given membership function to calculate an adaptation to the input variable so that a fuzzy reasoning will be carried out in accordance with a given rule. In addition, the rule extending terminals in the fuzzy inference units 100 and 110 can be connected to each other to facilitate the extension of the number of rules. Since the input variable is fixed, it is inputted to the input terminals IN1 and IN2 of the respective fuzzy inference units 100 and 110. The external extending input terminals are used to extend the number of input variables If it is desired to extend the number of rules as described, thus, the change-over switch 4 is set at the side "1" (i.e. power source VDD side).

Figure 6:
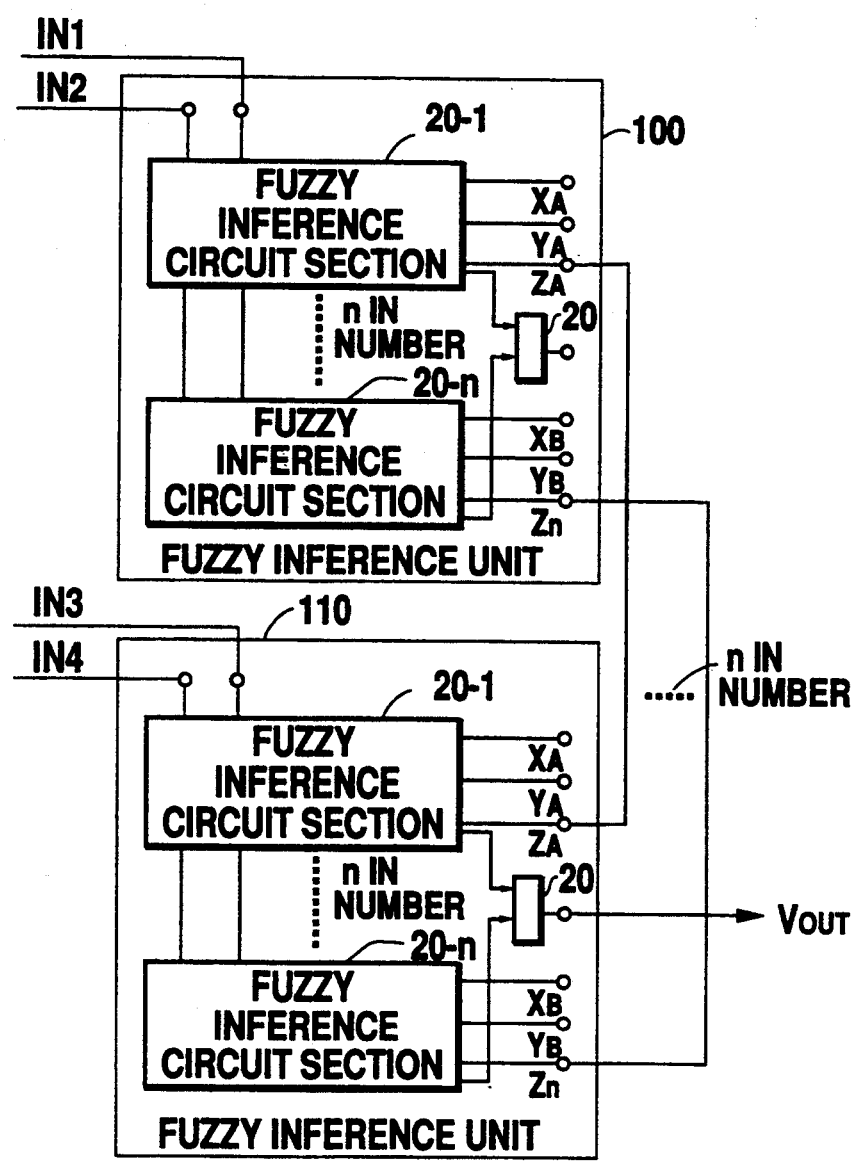
FIG. 6 is a block diagram of still another embodiment of a fuzzy inference system constructed to extend the number of input variables in accordance with the present invention.

FIG. 6 shows a fuzzy inference system which can be used to extend only the variable (input) but not the number of rules. The fuzzy inference system comprises a fuzzy inference unit 100 having an external extension terminal (output) $Y_A$ which can be connected to the external extension terminal (input) $X_A$ of the next fuzzy inference unit 110 to extend the system. When one fuzzy inference unit has two variables and if two of such fuzzy inference units are used, the system can be extended to have four variables. If three of such fuzzy inference units are used, the system can be extended to have six variables. Namely, the fuzzy inference system can be extended by the number of fuzzy inference. units times two variables. Since the first fuzzy inference unit 100 having inputs IN1 and IN2 does not receive data at its external extension terminal (input), the switch 4 there-of has been previously placed at the side "1". Since all the other fuzzy inference units receive data at their external extension terminals, all the switches thereof have been previously placed at the side "2".

Figure 7:
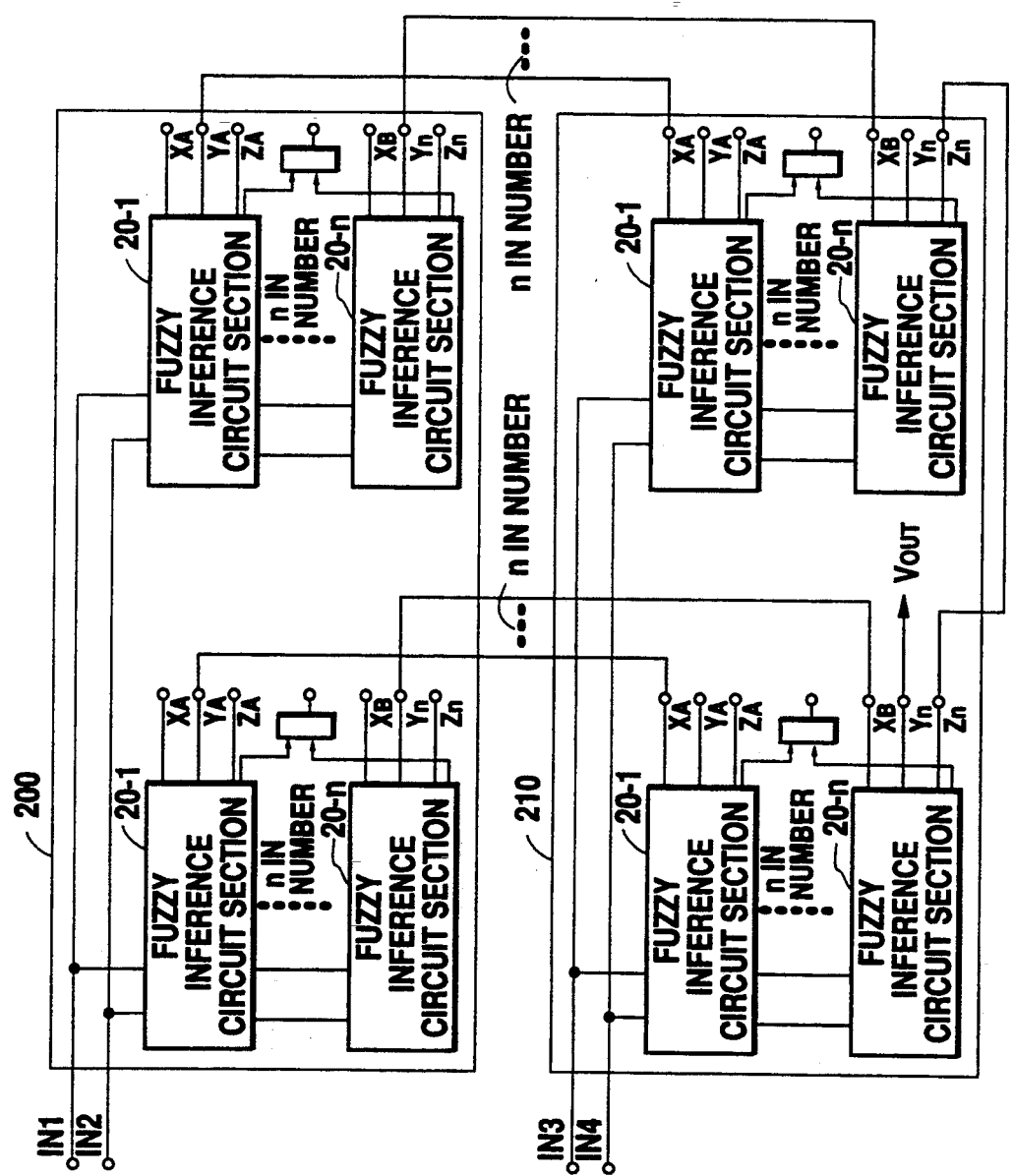
FIG. 7 is a block diagram of another embodiment of a fuzzy inference system constructed to extend the number of input variables and rules in accordance with the present invention.

FIG. 7 shows a fuzzy inference system which can be used to extend both the number of rules and variables. The fuzzy inference system comprises a plurality of fuzzy inference units 200, 210..., each of which has a fixed rule and which can extend the number of variables. When the external extension terminals and rule extension terminals therein are connected to each other in various combinations, both the number of rules and variables can be extended. Since the external extension input terminal of the first fuzzy inference unit 200 does not receive data, the switch 4 thereof has been previously set at the side "1". Since the other fuzzy inference unit 210 receives data at its external extension terminal, the switch 4 thereof has been previously set at the side "2". By connecting the fuzzy inference units in various combinations, both the number of rules and variables can be extended.

What is claimed is:

1. A fuzzy inference system comprising:
   (a) a plurality of fuzzy inference means, each for performing a fuzzy reasoning based on a respective rule of said each fuzzy inference means, and
   (b) centroid determining means for receiving an output of each of said fuzzy inference means and for forming a controlled output,
   wherein each of said fuzzy inference means comprises:
   a plurality of membership function generating units;
   external extension input means for receiving a variable-extending signal from another one of said fuzzy inference means;
   first minimum value calculating means for calculating a first minimum value from an output of each of said membership function generating units;
   second minimum value calculating means for calculating a second minimum value from the variable-extending signal of said external extension input means and said first minimum value; and
   external extension output means for externally outputting said second minimum value to at least one of said centroid determining means and another one of said fuzzy inference means.

2. The fuzzy inference system of claim 1, wherein said external extension input means comprises:
   an external extension input terminal receiving the variable-extending signal from another one of said fuzzy inference means; and
   a change-over switch to selectively apply the variable-extending signal from said external extension input terminal to said second minimum value calculating means.

3. A fuzzy inference system comprising:
   (a) a plurality of fuzzy inference means, each for performing a fuzzy reasoning based on a respective rule of said each fuzzy inference means; and
   (b) centroid determining means for receiving an output of each of said fuzzy inference means and for forming a controlled output,
   wherein each of said fuzzy inference means comprises:
   a plurality of membership function generating units;

external rule extending means for receiving a rule-extending signal from another one of said plurality of fuzzy inference means;

minimum value calculating means for calculating a minimum value from an output of each of said membership function generating units;

maximum value calculating means for calculating a maximum value from the rule-extending signal and the minimum value of the minimum value calculating means, the maximum value being output to the centroid determining means; and external extension output means for externally outputting the maximum value of said maximum value calculating means to another one of said fuzzy inference means as the rule-extending signal.

4. The fuzzy inference system of claim 3, wherein said external rule extending means comprises:

an external rule extension terminal receiving the rule-extending signal from another one of said fuzzy inference means; and a change-over switch to selectively apply the rule-extending signal from said external rule extension terminal to said maximum value calculating means.

5. A fuzzy inference system comprising:

(a) a plurality of fuzzy inference means, each for performing a fuzzy reasoning based on a respective rule of said each fuzzy inference means; and (b) centroid determining means for receiving an output of each fuzzy inference means and for forming a controlled output, wherein each of said fuzzy inference means comprises:

a plurality of membership function generating units, each membership function generation unit generating an output, external extension input means for receiving a variable-extending signal from another one of said fuzzy inference means, external rule extending means for receiving a rule-extending signal from another one of said plurality of fuzzy inference means, first minimum value calculating means for calculating a first minimum value from each output of said membership function generating units, second minimum value calculating means for computing a second minimum value from the variable-extending signal input from said external extension input means and the first minimum value, maximum value calculating means for calculating a maximum value from the rule-extending signal and the second minimum value, and external extension output means for externally outputting a signal corresponding to the maximum value of said maximum value calculating means.

* * * * *